(12) United States Patent
Winkler et al.

(10) Patent No.: US 9,754,732 B2
(45) Date of Patent: Sep. 5, 2017

(54) ENERGY STORAGE ARRANGEMENT

(75) Inventors: Josef Winkler, Kipfenberg (DE);
Michael Wansner, Schrobenhausen (DE)

(73) Assignee: AUDI AG, Ingolstadt (DE)

( * ) Notice: Subject to any disclaimer, the term of this patent is extended or adjusted under 35 U.S.C. 154(b) by 700 days.

(21) Appl. No.: 14/111,329

(22) PCT Filed: Mar. 30, 2012

(86) PCT No.: PCT/EP2012/001417
§ 371 (c)(1),
(2), (4) Date: Dec. 16, 2013

(87) PCT Pub. No.: WO2012/139713
PCT Pub. Date: Oct. 18, 2012

(65) Prior Publication Data
US 2014/0300181 A1 Oct. 9, 2014

(30) Foreign Application Priority Data

Apr. 12, 2011 (DE) .......... 10 2011 016 785
Jul. 22, 2011 (DE) .......... 10 2011 108 231
Sep. 1, 2011 (DE) .......... 10 2011 112 131

(51) Int. Cl.
*B60L 1/00* (2006.01)
*B60L 3/00* (2006.01)
(Continued)

(52) U.S. Cl.
CPC ............ *H01G 11/10* (2013.01); *B60L 3/0046* (2013.01); *B60L 3/04* (2013.01); *B60L 11/005* (2013.01);
(Continued)

(58) Field of Classification Search
CPC .. H02J 7/00; H02J 7/007; H02J 7/0019; H02J 7/0021; H02J 7/0052; H02J 7/04; G01N 27/416; H01M 10/02; H01M 4/64
(Continued)

(56) References Cited

U.S. PATENT DOCUMENTS 4,298,666 A    11/1981   Taskier
7,427,450 B2 *   9/2008   Raiser ................ B60L 11/1887
                                                 320/101

(Continued)

FOREIGN PATENT DOCUMENTS

CN            1893167 A    1/2007
CN          101682028 A    3/2010
(Continued)

OTHER PUBLICATIONS

International Search Report issued by the European Patent Office in International Application PCT/EP2012/001417; dated Mar. 30, 2012.
(Continued)

*Primary Examiner* — Fritz M Fleming
*Assistant Examiner* — Jagdeep Dhillon
(74) *Attorney, Agent, or Firm* — Henry M. Feiereisen LLC

(57) ABSTRACT

Energy storage arrangement with a rechargeable energy storage device, wherein the energy storage device includes a plurality of lithium-based storage elements. The energy storage device is composed of three lithium-based storage elements and one lithium titanate-based storage element, or four lithium-titanate-based storage elements and one lithium-based storage element, or three lithium-based storage elements and two nickel metal hydride-based storage elements.

11 Claims, 1 Drawing Sheet

(51) Int. Cl.
| | |
|---|---|
| H02G 3/00 | (2006.01) |
| H01G 11/10 | (2013.01) |
| B60L 3/04 | (2006.01) |
| B60L 11/00 | (2006.01) |
| B60L 11/18 | (2006.01) |
| F02N 11/08 | (2006.01) |
| H01M 10/052 | (2010.01) |
| H01M 16/00 | (2006.01) |
| H02J 7/14 | (2006.01) |
| H02J 7/34 | (2006.01) |
| B60R 16/033 | (2006.01) |
| H01M 10/34 | (2006.01) |
| H01M 10/30 | (2006.01) |
| H01M 10/0525 | (2010.01) |
| H01M 10/12 | (2006.01) |
| H01M 10/42 | (2006.01) |

(52) U.S. Cl.
CPC ....... *B60L 11/1868* (2013.01); *B60L 11/1879* (2013.01); *B60R 16/033* (2013.01); *F02N 11/0866* (2013.01); *H01M 10/052* (2013.01); *H01M 10/0525* (2013.01); *H01M 10/12* (2013.01); *H01M 10/30* (2013.01); *H01M 10/345* (2013.01); *H01M 10/4264* (2013.01); *H01M 16/00* (2013.01); *H02J 7/1423* (2013.01); *H02J 7/34* (2013.01); *B60L 2240/545* (2013.01); *F02N 11/087* (2013.01); *F02N 2011/0885* (2013.01); *H01M 2220/20* (2013.01); *Y02E 60/122* (2013.01); *Y02E 60/124* (2013.01); *Y02T 10/7005* (2013.01); *Y02T 10/7011* (2013.01); *Y02T 10/7022* (2013.01); *Y02T 10/7066* (2013.01)

(58) Field of Classification Search
USPC ........ 307/10.1, 9.1, 10.6, 10.7, 10.2, 80, 82, 307/66; 320/112, 128, 162; 324/426, 324/427, 425; 429/218.1, 235; 180/65.29, 65.21, 65.1, 65.8
See application file for complete search history.

(56) References Cited

U.S. PATENT DOCUMENTS

| | | | | |
|---|---|---|---|---|
| 7,474,249 B1* | 1/2009 | Williams | ............... | B64G 1/428 342/25 R |
| 8,120,290 B2 | 2/2012 | King | | |
| 2005/0062456 A1* | 3/2005 | Stone | .................... | H02J 7/0016 320/116 |
| 2006/0197496 A1 | 9/2006 | Iijima et al. | | |
| 2007/0229034 A1* | 10/2007 | Tatebayashi | ........ | H01M 10/052 320/132 |
| 2009/0081534 A1 | 3/2009 | Takami et al. | | |
| 2010/0025132 A1* | 2/2010 | Hill | .......................... | B60K 1/04 180/65.29 |
| 2010/0072946 A1 | 3/2010 | Sugano | | |
| 2011/0001352 A1 | 1/2011 | Tamura et al. | | |
| 2011/0057615 A1* | 3/2011 | Cegnar | .................. | H02J 7/0004 320/112 |
| 2011/0143202 A1* | 6/2011 | Farmer | ............... | H01M 4/0416 429/218.1 |
| 2011/0156651 A1* | 6/2011 | Christensen | .......... | B60L 3/0046 320/128 |
| 2011/0189520 A1* | 8/2011 | Carter | .................. | B60L 11/1879 429/107 |
| 2011/0248719 A1* | 10/2011 | Aoki | ................... | H01M 10/482 324/426 |
| 2015/0380952 A1* | 12/2015 | Brandt | ................ | H01M 10/441 320/119 |

FOREIGN PATENT DOCUMENTS

| | | |
|---|---|---|
| DE | 112005003104 T5 | 10/2007 |
| DE | 102006048872 A1 | 5/2008 |
| DE | 112008000980 T5 | 2/2010 |
| DE | 102009044211 A1 | 4/2010 |
| DE | 102011112131 A1 * | 10/2012 |
| EP | 1138554 A2 | 10/2001 |
| EP | 2272722 A2 | 1/2011 |
| JP | 2001-143702 A | 5/2001 |

OTHER PUBLICATIONS

Rainer Jung; Bordnetzmanagement für Mehrbatterien-Systeme (Management of on board electrical systems for multi-battery systems); technik profi, vol. 26/2006; p. 7-11.

Chinese Search Report issued by the Chinese Patent Office in Chinese Patent Application No. 2012800289754 dated Jun. 16, 2015.

English translation of Chinese Search Report issued by the Chinese Patent Office in Chinese Patent Application No. 2012800289754 dated Jun. 16, 2015.

* cited by examiner

ENERGY STORAGE ARRANGEMENT

CROSS-REFERENCES TO RELATED APPLICATIONS

This application is the U.S. National Stage of International Application No. PCT/EP2012/001417, filed Mar. 30, 2012, which designated the United States and has been published as International Publication No. WO 2012/139713 and which claims the priority of German Patent Application, Serial No. 10 2011 016 785.4, filed Apr. 12, 2011, and of German Patent Application, Serial No. 10 2011 108 231.3, filed Jul. 22, 2011, and of German Patent Application, Serial No. 10 2011 112 131.9, filed Sep. 1, 2011, pursuant to 35 U.S.C. 119(a)-(d).

BACKGROUND OF THE INVENTION

The invention relates to an energy storage arrangement with a rechargeable energy storage device, wherein the energy storage device includes a plurality of lithium-based storage elements.

Energy storage systems having multiple parallel rechargeable energy storage device are typically installed in modern motor vehicles, wherein a first energy storage is usually a lead-acid battery having several lead-based storage elements, also referred to as cells. A second energy storage device connected in parallel may be in the form of a capacitor, which generates, for example, the high currents required during starting of the motor vehicle. This is particularly advantageous when the high currents cannot be provided by the first energy storage device alone due to its low state of charge.

A fundamental problem with lead-based energy storage devices is the voltage drop as soon as a generator or battery charger from the power taken off or disconnected from the power grid. The voltage drop may in a typical lead-acid battery installed in a motor vehicle between a charging voltage of about 14 volts (V) during the charging process to a nominal voltage of about 12 volts amount when the charging current is removed. It is also disadvantageous with lead-based energy storage devices that they have a relatively low number of cycles, meaning that they can only be used for a comparatively small number of charging or discharging cycles. Both aspects have a negative impact on the overall performance of an energy storage arrangement based on lead-based energy storage devices. These problems equally apply to vehicles having a 24 volt onboard electrical system and vehicles having a 28 volt onboard electrical system, such as trucks or buses.

SUMMARY OF THE INVENTION

The present invention therefore addresses the problem to provide an improved energy storage arrangement.

The problem is solved by an energy storage arrangement of the aforedescribed type, which is characterized in that the energy storage device is formed of 3 storage elements based on lithium and 1 storage element based on lithium titanate or 4 storage elements based on lithium titanate and 1 storage element based on lithium or 3 storage elements based on lithium and 2 storage elements based on a nickel metal hydride.

The present invention proposes an energy storage arrangement with an energy storage device having a plurality of lithium-based storage elements, which is formed of 3 storage elements based on lithium and 3 storage element based on lithium titanate, or 4 storage elements based on lithium titanate and 1 storage element based on lithium, or 3 storage elements based on lithium and 2 storage elements based on a nickel metal hydride.

The principle of the invention is therefore based in relation to the first two embodiments substantially on the combination of different types of lithium-based storage elements which are interconnected to form the energy storage device associated with the energy storage arrangement according to the invention. The principle of the invention hereby provides alternative embodiments of a corresponding energy storage device. According to the invention, the energy storage device may be formed of 3 storage elements based on lithium and one storage element titanate or alternatively 4 storage elements based on lithium titanate and storage element based on lithium.

According to the third embodiment, the energy storage is formed of 3 storage elements based on lithium and 2 storage elements based on a nickel metal hydride. Consequently, the storage elements forming the energy storage device are only partly based on lithium, namely in the form of the 3 storage elements based on lithium. The remaining two storage elements forming the energy storage device are based on nickel metal hydride (NiMH) or a nickel metal hydride compound. Storage elements based on nickel metal hydride typically include a first electrode, in particular a negative electrode made of nickel (II) hydroxide, and a second electrode, in particular a positive electrode made of a metal hydride, i.e. in general a metal-hydrogen compound.

All lithium-based storage elements are preferably based on a lithium-cobalt-manganese-nickel compound and are therefore preferably present as NMC storage elements or NMC cells.

The energy storage device according to the invention and the energy storage arrangement of the invention, respectively, have a number of advantages, in particular compared to a corresponding energy storage device based on lead. This includes, for example, a longer service life and improved recuperation characteristics, i.e. an improved suitability for use in a recuperation operation of a motor vehicle.

Specifically, a parallel circuit of an additional, in particular lead-based energy storage device with the energy storage device according to the inventive principle is not absolutely necessary, so that the afore-mentioned disadvantages associated with the use of lead-based energy storage devices do not occur in the energy storage device according to the invention. In principle, however, it is conceivable to connect at least one additional energy storage device in parallel with the energy storage device.

Although the following discussion applies essentially to the installation of the energy storage arrangement in a motor vehicle, it is of course also possible to use the energy storage arrangement device in other technical areas.

Because the energy storage arrangement forms a part of an electrical onboard system of a motor vehicle, wherein the onboard electrical system includes at least one generator, in particular for charging the energy storage device, and at least one load consuming electric power, the energy storage device forming the energy storage arrangement according to the invention is used both for starting the motor vehicle and an associated drive assembly, respectively, as well as for operating corresponding loads connected to the onboard electrical system.

The electrical system is in particular a 12V onboard electrical system, wherein the energy storage device is formed of 3 storage elements based on lithium and 1 storage element based on lithium titanate, or 4 storage elements based on lithium titanate and 1 storage element based on lithium, or 3 storage elements based on lithium and 2 storage elements based on a nickel metal hydride.

The onboard electrical system may be either a 24V or a 28V onboard electrical system. In a 24V or 28V onboard electrical system, the aforementioned number of storage elements doubles, while the possibilities for combining the different types of storage elements remain the same. In particular in a 24V onboard electrical system, the energy storage device may be formed of 7 storage elements based on lithium.

The storage elements forming the energy storage device are preferably connected in series. Series circuits of similar storage elements are widely known. The voltage of the energy storage device can then be set to almost any high values depending on the number of serially connected storage elements. The nominal voltages associated with the individual storage elements typically add up, so that the energy storage device has a nominal voltage corresponding to the sum of the individual nominal voltages of the respective storage elements.

Advantageously, electrical switching means, in particular a safety switch, may be connected upstream of the energy storage device. The electrical switching means operate here, for example, as overvoltage protection and/or undervoltage protection and/or thermal protection. The electrical switching means may be configured a residual current circuit breaker. The electrical switching means may conceivably be switched by a suitable control device connected thereto.

As mentioned above, the energy storage arrangement according to the invention may in principle include at least one additional rechargeable energy storage device connected in parallel with the energy storage device. The additional energy storage device may be, for example, an energy storage device in form of a lead battery with a plurality of lead-based storage elements.

In addition, the invention relates to a motor vehicle with at least one energy storage arrangement as described above. The motor vehicle is in particular constructed as a hybrid vehicle or as an exclusively electric vehicle.

BRIEF DESCRIPTION OF THE DRAWING

Further advantages, features and details of the invention will become apparent from the exemplary embodiments described hereinafter and with reference to the drawings, which show in.

DETAILED DESCRIPTION OF PREFERRED EMBODIMENTS

Figure 1:
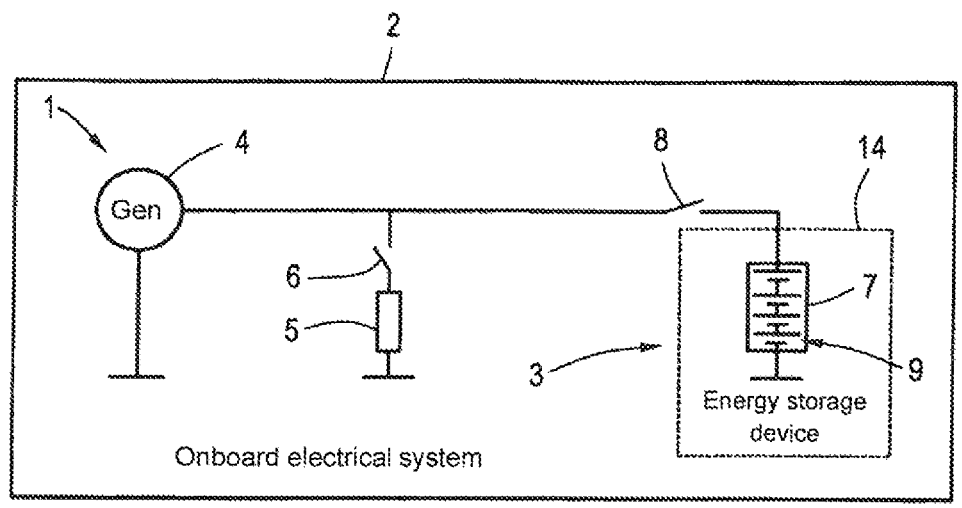
FIG. 1 a schematic diagram of an onboard electrical system of a motor vehicle according to an exemplary embodiment of the invention.

FIG. 1 shows a schematic diagram of an onboard electrical system 1 of a motor vehicle 2 according to an exemplary embodiment of the invention. An energy storage device 3, a generator 4, and at least one load 5 consuming electrical power in operation, for example an air conditioner, are associated with the onboard electrical system 1. The load 5 can be disconnected from the onboard electrical system 1 by a switch 6.

The energy storage arrangement 3 includes a rechargeable energy storage device 7. An electrical switch 8 is connected upstream of the energy storage device 7, allowing the electrical connection between the generator 4 and the energy accumulator 7 to be disconnected. The switch 8 assumes safety functions, in particular overvoltage protection, undervoltage protection and temperature protection. The onboard electrical system 1 is implemented as a 12V onboard electrical system. The supply voltage of the onboard electrical system 1 is about 12.5 to 15.5 volts.

As indicated by the dashed box 14, the energy storage arrangement 3, i.e. the energy storage device 7, can be arranged in a housing. This provides a particularly compact, easy to handle and light-weight version of the energy storage arrangement 3.

Figure 2:
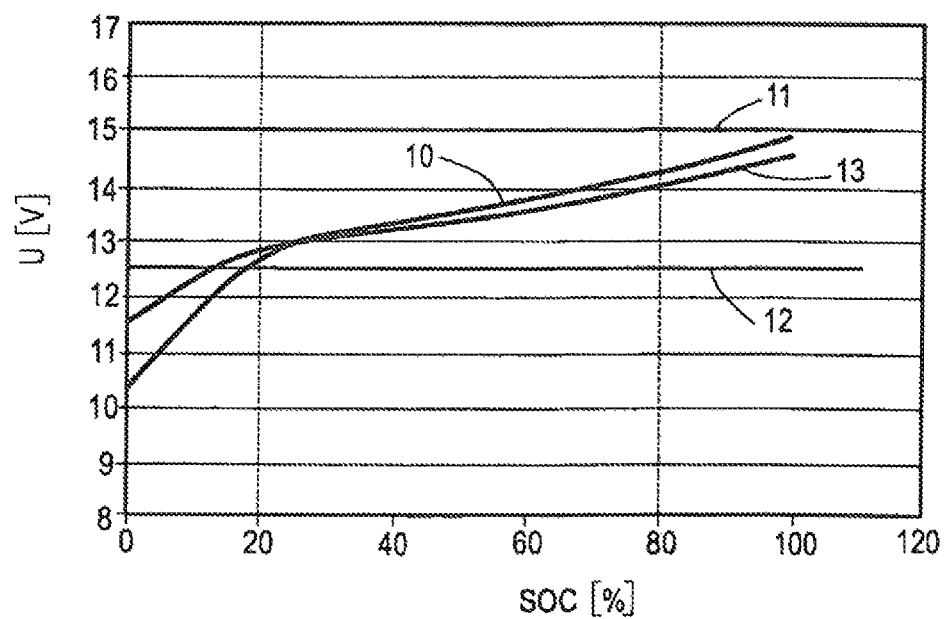
FIG. 2 a diagram showing the course of the battery voltage V as a function of the state of charge SOC of two exemplary embodiments of an energy storage device according to the invention.

The energy storage device 7 is present as a lithium battery and is formed of three storage elements 9 based on lithium and one serially-connected storage element 9 based on lithium titanate (see FIG. 2, line 10). Alternatively, the energy storage device 7 may be formed of four storage elements 9 based on lithium titanate and one serially-connected storage element 9 based on lithium (see FIG. 2, line 11).

Alternatively, the energy storage device 7 not be formed exclusively as a pure lithium battery, but rather as a mixed lithium battery. In this embodiment, the energy storage device 7 is composed of three storage elements 9 based on lithium and two storage elements 9 based on a nickel metal hydride (NiMH) or a nickel metal hydride compound (see FIG. 2, line 12).

All lithium-based storage elements 9 of the energy storage device 7 are preferably based on a lithium-nickel-manganese-cobalt compound and are therefore preferably present as NMC storage elements or NMC cells.

FIG. 2 shows a diagram for the course of the battery voltage U as a function of the state of charge SOC of three embodiments of an energy storage device 7 according to the invention (see FIG. 2, lines 10, 11, 12). As can be seen from FIG. 2, the nominal voltage of the energy storage device 7 formed of three storage elements 9 based on lithium and one storage element 9 based on lithium titanate (see FIG. 2, line 10) is, when the energy storage device 7 has a state of charge of between 20 and 80% in relation to a state of charge interval with boundaries of 0 and 100%, in a range between the maximum charging voltage (see FIG. 2, line 13) and the nominal voltage (see FIG. 2, line 14) of a purely theoretical lead-based energy storage device. As shown in particular in FIG. 1, the latter however is not part of the onboard electrical system 1 and the energy storage device 3, respectively, but only serves to illustrate the course of the battery voltage U of the energy storage device 7 in FIG. 2.

The exemplary embodiment according to the invention of an energy storage device 7 formed of four storage elements 9 based on lithium titanate and one storage element 9 based on lithium (see FIG. 2, line 11) exhibits a similar profile of the battery voltage U. Accordingly, the nominal voltage of the energy storage device 7 is, when the energy storage device 7 has a state of charge of between 20 and 80% in relation to a state of charge interval with boundaries of 0 and 100%, in a range between the maximum charging voltage (see FIG. 2, line 13) and the nominal voltage (see FIG. 2 line 14) of a purely theoretical lead-based energy storage device.

The exemplary embodiment according to the invention of an energy storage device 7 formed of three storage elements 9 based on lithium and two storage elements 9 based on nickel metal hydride or a nickel metal hydride compound exhibits a similar profile of the battery voltage U. Accordingly, the nominal voltage of the energy storage device 7 is, when the energy storage device 7 has a state of charge of between 20 and 80% in relation to a state of charge interval with boundaries of 0 and 100%, in a range between the maximum charging voltage (see FIG. 2, line 13) and the nominal voltage (see FIG. 2, line 14) of a purely theoretical lead-based energy storage device.

As an alternative to the aforementioned embodiments of the energy storage arrangement 3 and the energy storage device 7, respectively, for use in a 12V onboard electrical system 1, an energy storage arrangement 3 according to the invention may, of course, also be designed for a 24 V onboard electrical system 1. The respective number of the afore-described storage elements 9 then doubles, while the possible combinations of different types of storage elements remain the same. In particular in a 24V onboard electrical system 1, the energy storage device 7 may be formed of seven storage elements 9 based on lithium.

With all the aforementioned embodiments, the energy storage arrangement 3 according to the invention may in principle have at least one additional rechargeable energy storage device connected in parallel with the energy storage device 7. The additional energy storage device, for example, be an energy storage device having, like a lead acid battery, several lead-based storage elements.

What is claimed is:

1. An energy storage arrangement comprising a rechargeable energy storage device having a plurality of lithium-based storage elements selected from one of the following configurations each including storage elements of different types:
   - 3 storage elements based on lithium and 1 storage element based on lithium titanate, which are composed of different materials and thereby are the storage elements of different types, or
   - 4 storage elements based on lithium titanate and 1 storage element based on lithium, which are composed of different materials and thereby are the storage elements of different types, or
   - 3 storage elements based on lithium and 2 storage elements based on a nickel metal hydride, which are composed of different materials and thereby are the storage elements of different types.

2. The energy storage arrangement of claim 1, wherein the plurality of storage elements are connected in series.

3. The energy storage arrangement of claim 1, further comprising an electrical switching device connected upstream of the energy storage device.

4. The energy storage arrangement of claim 3, wherein the electrical switching device is a safety switch configured to provide overload protection, undervoltage protection and temperature protection.

5. The energy storage arrangement of claim 1, wherein the energy storage arrangement forms part of an onboard electrical system of a motor vehicle, wherein the onboard electrical system comprises at least one generator and at least one load consuming electrical power and disconnectable from the onboard electrical system.

6. The energy storage arrangement of claim 5, wherein the at least one generator charges the energy storage device.

7. A motor vehicle, comprising at least one energy storage arrangement with a rechargeable energy storage device having a plurality of lithium-based storage elements selected from one of the following configurations each including storage elements of different types:
   - 3 storage elements based on lithium and 1 storage element based on lithium titanate, which are composed of different materials and thereby are the storage elements of different types or
   - 4 storage elements based on lithium titanate and 1 storage element based on lithium, which are composed of different materials and thereby are the storage elements of different types, or
   - 3 storage elements based on lithium and 2 storage elements based on a nickel metal hydride, which are composed of different materials and thereby are the storage elements of different types.

8. The motor vehicle of claim 7, wherein the energy storage arrangement forms part of an onboard electrical system of the motor vehicle, wherein the onboard electrical system comprises at least one generator and at least one load consuming electrical power and disconnectable from the onboard electrical system.

9. The motor vehicle of claim 8, wherein the at least one generator charges the energy storage device.

10. An energy storage arrangement comprising a rechargeable energy storage device having a plurality of lithium-based storage elements selected from one of the following configurations each including storage elements of different types:
    - 3 storage elements based on lithium and 1 storage element based on lithium titanate, which are composed of different materials and thus are the storage elements of different types, or
    - 4 storage elements based on lithium titanate and 1 storage element based on lithium, which are composed of different materials and thus are the storage elements of different types, or
    - 3 storage elements based on lithium and 2 storage elements based on a nickel metal hydride, which are composed of different materials and thus are the storage elements of different types,
    wherein the plurality of storage elements are connected in series; and
    an electrical switching device connected upstream of the energy storage device, wherein the electrical switching device is a safety switch configured to provide overload protection, undervoltage protection and temperature protection.

11. A motor vehicle, comprising at least one energy storage arrangement with a rechargeable storage device having a plurality of lithium-based storage elements selected from one of the following configurations each including storage elements of different types:
    - 3 storage elements based on lithium and 1 storage element based on lithium titanate, which are composed of different materials and thus are the storage elements of different types, or
    - 4 storage elements based on lithium titanate and 1 storage element based on lithium, which are composed of different materials and thus are the storage elements of different types, or
    - 3 storage elements based on lithium and 2 storage elements based on a nickel metal hydride, which are composed of different materials and thus are the storage elements of different types,
    wherein the plurality of storage elements are connected in series; and
    an electrical switching device connected upstream of the energy storage device, wherein the electrical switching device is a safety switch configured to provide overload protection, undervoltage protection and temperature protection.

* * * * *